July 29, 1969  O. C. NICOLAUS ET AL  3,458,326
APPARATUS FOR COOKING GRAIN
Filed Sept. 23, 1966  3 Sheets-Sheet 2

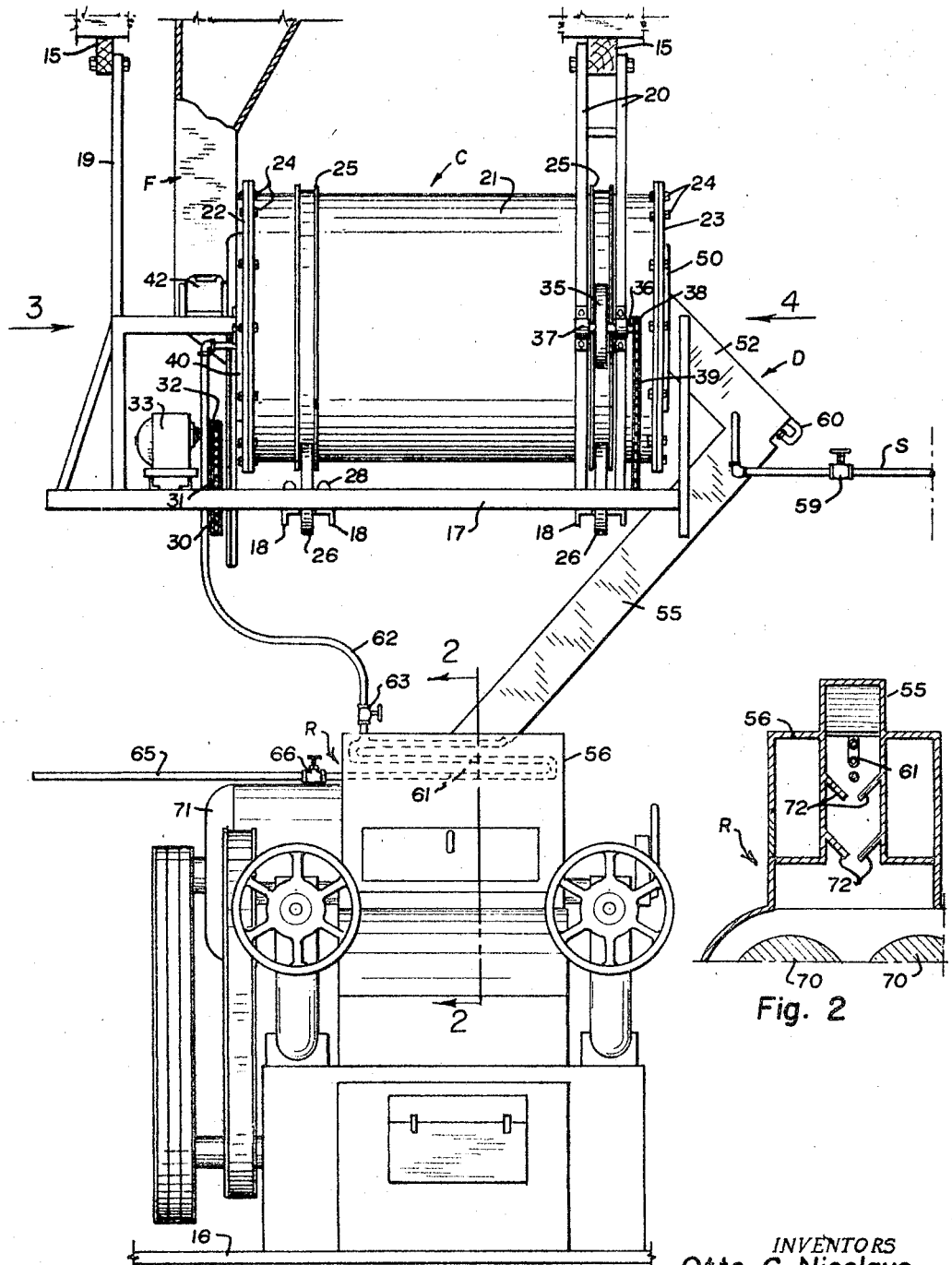

INVENTORS
Otto C. Nicolaus
Delmar O. Nicolaus
BY *Van Valkenburgh & Lowe*
ATTORNEYS July 29, 1969    O. C. NICOLAUS ET AL    3,458,326
APPARATUS FOR COOKING GRAIN
Filed Sept. 23, 1966      3 Sheets-Sheet 3
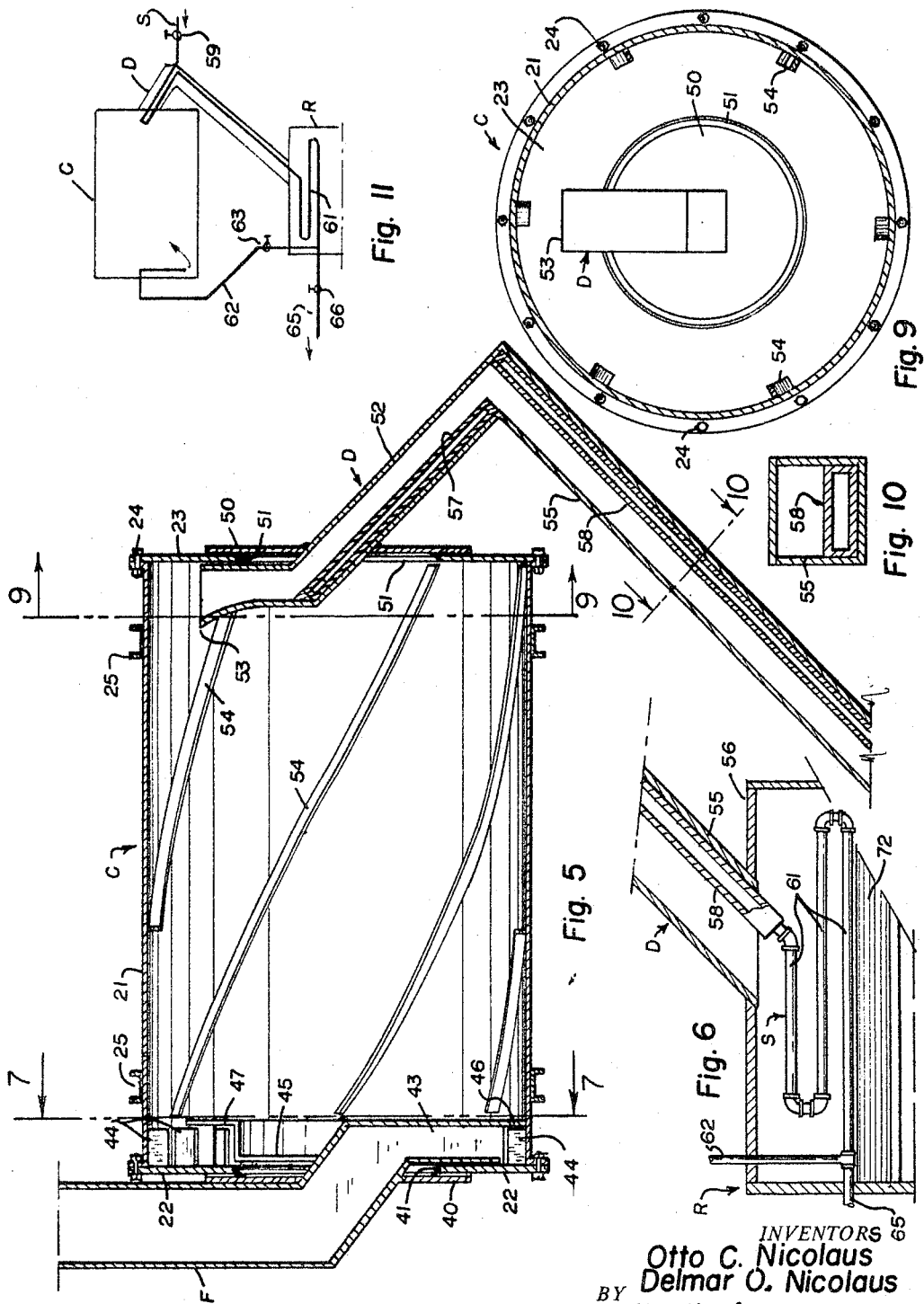
INVENTORS
Otto C. Nicolaus
Delmar O. Nicolaus
BY
Van Valkenburgh & Lowe
ATTORNEYS

United States Patent Office 3,458,326
Patented July 29, 1969

3,458,326
APPARATUS FOR COOKING GRAIN
Otto C. Nicolaus, 212 E. 7th St., and Delmar O. Nicolaus, 823 Cedar, both of Julesburg, Colo. 80737
Filed Sept. 23, 1966, Ser. No. 581,598
Int. Cl. A01f; A23l *1/18*
U.S. Cl. 99—235                       6 Claims

ABSTRACT OF THE DISCLOSURE

An apparatus for cooking grain wherein the grain is moved into one end of a rotating drum treated with live steam to thereafter flow out of the drum and through a heated discharge chute, the secondary heating operation being effective to supplement the steam cooking operation with a dry heat application to better condition the grain for storage and subsequent rolling.

---

This invention relates to means and apparatus for cooking and preparing cereal grain, such as wheat, milo, corn, barley and oats, and more especially to grain cookers for the preparation of cereals for livestock.

It is known that any whole grain cereal such as wheat, barley or oats will be rendered far more nutritious and palatable as a livestock food if it is first cooked and then crushed. The grain is easily cooked in a closed or partially closed container by injecting live steam into the container for a time period sufficient to permeate the individual grains of the cereal until they are enlarged and softened. Thereafter, the grain may be fed directly to livestock or preferably, it is crushed in rollers. Conceivably, the cereal grain can be further treated to remove the husks but such is not necessary or even desirable where the cereal is used for livestock feed.

Although various types of grain cookers are available, including apparatus which cooks the grain with steam, the processes presently practiced and the apparatus commonly used for such cooking have certain shortcomings which detract from the value of the final product and which sometimes cause trouble. First, there is a tendency of the freshly steamed grain to produce condensation moisture as it cools. This moisture is undesirable for it creates a good environment for fungus growth and for rotting. Also the moisture is especially undesirable since dust and small particles present in the grain collect and congeal to a mud, which may cake and clog the milling machinery associated with the cooker in a most undesirable manner. In an effort to minimize such condensation moisture, the cereal is not always completely cooked and the center portions of the grains are unaffected by the steam. To prevent such undesirable results as above noted, the grain may be moved from the cooker to a drying area before it is rolled, all of which requires a substantial amount of equipment including conveyors, blowers and the like.

The present invention was conceived and developed to improve the present grain cooking operations, produce dry, fully cooked grain and to provide for improved and simplified grain cooking apparatus. The invention contemplates a dry-heat, heated transfer chute to deliver grain from the cooker to a roller sufficient to effectively supplement the heat effect of steam in the cooker, to complete cooking and at the same time to eliminate subsequent condensation. The invention further contemplates the use of an improved construction of a drum-type grain cooker which permits a constant flow of grain through it, while it remains substantially full so that a maximum amount of grain remains in the cooker to be thoroughly treated with the steam.

The objects of the invention includes the provision of a novel and improved grain cooking operation adapted to supplement the moist heat of steam with a dry heat as the grain leaves the cooking apparatus which: effectively drives excess moisture from the surface of the grain kernels into the kernels; completely eliminates condensation after the grain is cooked and cooled; effects a more thorough and complete cooking of the grain; eliminates the formation of mud or sludge ordinarily formed by dust and small particles present in the grain; and renders the grain more suitable for rolling or further treatment before it is ready for use.

Other objects of the invention are to provide a novel and improved grain cooking apparatus which: automatically fills with grain and then maintains a regulated uniform flow of grain into and from it; effectively mixes the grain as steam is injected into it; injects steam at a location near the point of grain intake to produce a flow of steam through the entire charge within the apparatus; permits steam at a high temperature to be effectively absorbed by the grain as it expands; and agitates the grain thoroughly as it is steamed to assure an effective cooking of all grain kernels.

With the foregoing and other objects in view, all of which more fully hereafter appear, my invention comprises certain constructions, combinations and arrangements of parts and elements as hereinafter described, defined in the claims and illustrated in preferred embodiment in the accompanying drawing in which:

FIGURE 1 is a front elevational view, somewhat diagrammatic in nature, of the improved grain cooker, including an intake feed chute as from a storage elevator, a discharge chute, and a grain roller for further treatment of grain.

FIGURE 2 is a fragmentary sectional elevational view of a portion of the discharge chute and roller-crusher, as taken on the indicated line 2—2 at FIG. 1.

FIGURE 5 is a longitudinal sectional elevational view of the cooker, a portion of the intake chute, and the discharge chute, as taken from the indicated line 5—5 at FIG. 4, but on an enlarged scale.

FIGURE 6 is a fragmentary longitudinal sectional view of the lower end of the discharge chute and of the upper end of the roller-crusher, as taken from the indicated line 6—6 at FIG. 4, but on an enlarged scale.

FIGURE 9 is a transverse sectional elevation of the cooker as taken from the indicated line 9—9, at FIG. 5.

FIGURE 10 is a transverse sectional detail view as taken from the indicated line 10—10 at FIG. 5 but on an enlarged scale.

FIGURE 11 is a diagrammatic view of the steam line system through the apparatus.

Figure 3:
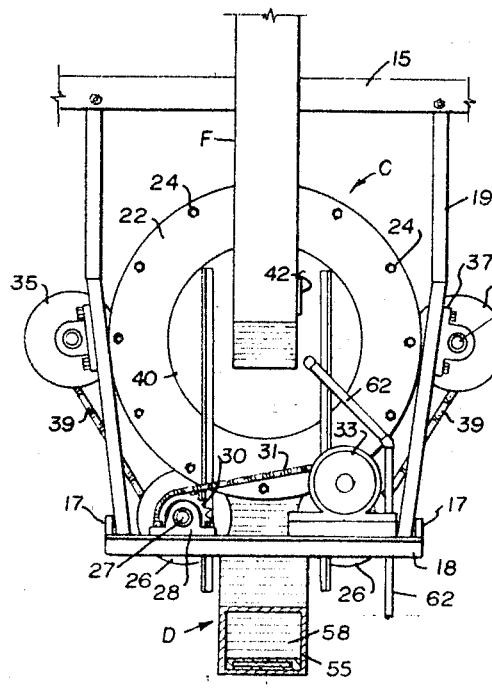
FIGURE 3 is an end elevational view of the intake end of the cooker as from the indicated arrow 3 at FIG. 1.

The improved cooking apparatus is especially adapted to be associated with a grain elevator of a type where grain is conveyed upwardly into hoppers or bins for storage above the ground so that it may be easily dispensed from the storage bin through a chute. The improved cooker and a grain roller constituting a preferred embodiment of the present inventive organization is conveniently located underneath such an elevator storage bin in a stacked arrangement to permit a gravity flow of grain from the storage bin through the cooker, thence through the grain roller and finally to a storage bin or receiver hopper below the roller.

Referring more particularly to the drawing, the primary components of the improved apparatus, all of which will be further described, include a cylindrical drum-like cooker C which is mounted to rotate about the horizontal axis. An intake feed chute F from a storage bin above the cooker, not shown, terminates at one end of the cooker. This cooker C is suspended from beams 15 of the storage bin structure. A discharge chute D commences at the opposite end of the cooker and is directed downwardly to a grain roller R placed conveniently underneath the cooker. The grain roller R, a conventional unit which rolls and crushes the grain, is conveniently mounted upon a floor 16 of the elevator structure and the rolled grain is discharged from it and falls into a bin, not shown, which is below this floor. The apparatus also includes a steam supply line S which extends from a pressure boiler, not shown, to a suitable connection at the discharge chute D to extend thence through the apparatus. The several motors which drive the apparatus are connected with suitable power lines and include controls but such lines and controls are not shown for they may be of any conventional arrangement.

The cooker, suspended from the bin beams 15, includes a rectangular supporting framework consisting of longitudinal members 17, suitable transverse members 18, vertical suspension supports 19 at the intake end of the cooker and pairs of spaced-apart vertical suspension supports 20 at the discharge end of the cooker. The framework also includes other struts, plates and members adapted to support and hold the several members of the organization in any suitable manner.

The cooker C, a horizontally-axised cylindrical drum 21 is of any convenient size, such as of a diameter of between two and three feet and length of between four and five feet, to provide a unit having a desirable capacity of approximately 10,000 pounds of grain per hour. The drum 21 is a substantially rigid steel cylinder having outturned end flanges, one of which connects with a disc-shaped intake end plate 22 and the other connects with a similar disc-shaped discharge end plate 23. These plates are securely attached to the cylinder flanges as by circles of bolts 24.

Two flanged guide rings 25 circumscribe this cylinder, one being near each end thereof, to receive the track the drum upon spaced pairs of support rollers 26 which are mounted upon parallel, longitudinally-disposed shafts 27 at the sides of the drum. The shafts 27 are carried in bearings 28 which, in turn, are supported upon the transverse frame supports 18. In operation, this drum rotates at a moderately slow speed such as approximately 15 revolutions per minute. It may be driven in any desirable manner and is conveniently driven by the support rollers 26 in the manner illustrated. The shafts carrying the rollers at each end of the drum are spaced apart in a symmetrical manner at each side of the drum to balance its weight on the rollers.

The rollers are rotated by rotation of the shafts 27. Each shaft 27, parallel to the other, carries a sprocket 30 at its end adjacent to the intake end of the drum and the sprockets are interconnected by a chain 31 between them, the top reach of which also extends upwardly at one side for further connection with a drive sprocket 32 of a drive motor 33. This motor 33 is preferably a speed reducer type capable of rotating its sprocket 32 at a slow rate to obtain, through the rollers, the desired rate of rotation of the drum.

Figure 4:
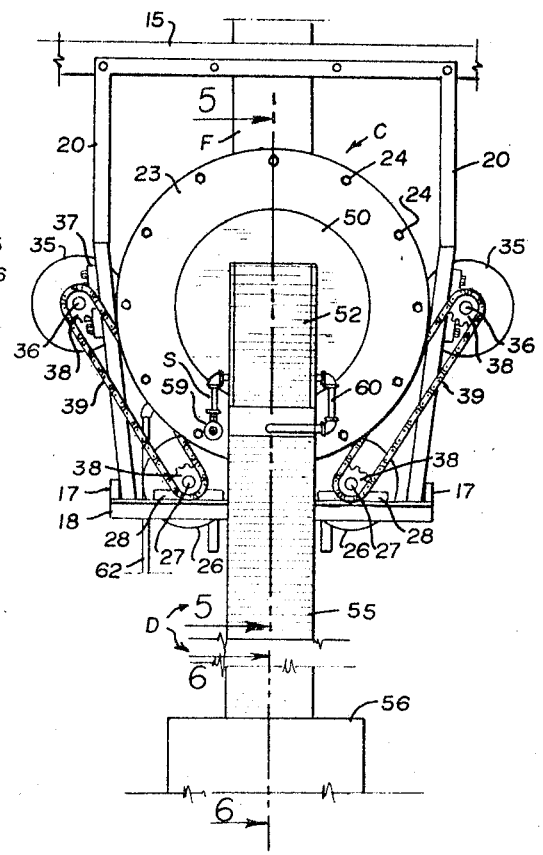
FIGURE 4 is an end elevational view of the discharge end of the cooker, as from the indicated arrow at FIG. 1.

To better stabilize the drum laterally, a pair of side rollers 35 engage the guide ring 25 adjacent to the discharge end of the drum. Each side rollers 35 is mounted on a short shaft 36 carried in bearings 37 which are held by the spaced-apart vertical suspension supports 20. Each shaft 36 extends through one end of the bearing to carry a sprocket 38 for connection with a like sprocket 38 on the end of the shaft 27 therebelow as by a chain 39 as in the manner illustrated at FIG. 4, such completing the drive of the apparatus.

Figure 8:
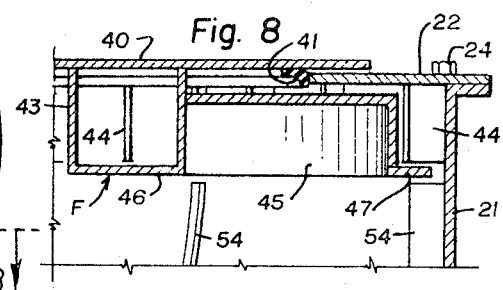
FIGURE 8 is a fragmentary sectional detail as taken from the indicated line 8—8, at FIG. 7.

The intake feed chute F extends downwardly from the storage bin and into the drum through a central circular opening in the intake end plate 22. This opening in the end plate 22 is overlaid by a circular lid 40 which is affixed to the feed chute F with the lower end of the chute extending through the lid 40 and being offset so that it may extend downwardly to the bottom of the drum 21 as will be described. The lid 40, held in position against the end plate 22 of the drum, encloses that end of the drum and a seal strip 41 is located about the circular opening in the end plate to contact the inner face of the lid to form an effective seal when the drum rotates and the lid remains fixed, the seal being shown at FIG. 8. As thus described, the feed chute F communicates directly to the interior of the drum 21 and a suitable slide gate 42 may be located in the feed chute adjacent to the drum for inspection and cleaning as necessary.

Figure 7:
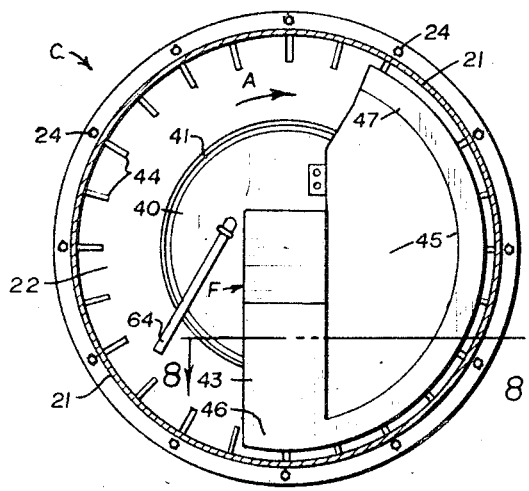
FIGURE 7 is a transverse sectional elevation of the cooker as taken from the indicated line 7—7, at FIG. 5.

The offset discharge end of the feed chute within the drum turns downwardly as a downspout 43 having its exit near the bottom level of the horizontally disposed drum interior. This downspout 43 is adapted to be functionally correlated with a circumferential array of longitudinally and radially disposed paddles 44 at the inner wall of the drum 21 adjacent to the intake end plate 22, and with an arcuate baffle 45 which overlays a portion of the paddles, to fill the drum and to keep it filled with grain to a selected level near the top of the drum as will now be explained. The downspout 43 terminates immediately over the paddles 44 with the face of the downspout which parallels the end plate 22 forming an overlapping lip 46 to embrace the ends of the paddles 44 as they move underneath the downspout. The baffle 45 is affixed to the lid 40 and is formed with an arcuate shoulder 47 which overlies the paddles 44 at one side of the drum and which connects with the bottom of the downspout 43 and lip 46 to provide a continuous passageway through which the paddles move, the entrance being a point near the top of the drum where the baffle commences and the exit being at the opposite side of the downspout. It follows that such movement of the paddles establishes the direction of rotation of the drum as indicated by the arrow A at FIG. 7.

With paddles moving through the baffle shoulder 47 towards and underneath the downspout, and through a substantially continuous passageway whose intake is near the top of the drum, and whose exit is at the side of the downspout opposite the baffle, the drum will fill with grain to the intake point and then not receive any more grain. Rotation of the drum moves the paddles through the passageway and underneath the exit of the downspout and causes the spaces between the paddles to fill with grain from the downspout. This grain is effectively moved or pumped into the drum. However, when the drum is filled to the top of the baffle, the grain will flow into the passageway to fill the spaces between the paddles and effectively block off the flow of grain from the intake feeder chute F.

The opposite end of the drum, the discharge end plate 23, is formed similar to the intake plate 22 including a central, circular opening therein. This circular opening is overlaid by a closure lid 50 whereto the discharge chute D is connected. The lid is held in position by suitable frame members, not shown, and a seal strip 51 around the circular opening in the discharge end plate 23 contacts the lid 50 to seal the gap between the end plate and lid, the same as hereinbefore described.

The discharge chute D, as illustrated, is formed as two sections. The upper section 52 extends through and may be supported by the lid 50. The portion of the section 52 within the drum extends upwardly to terminate as an overfall lip edge 53 at a desired elevation, preferably the same or slightly below the elevation of the top of the baffle 45 to permit a selected flow of grain through the drum, to discharge over the lip edge 53. The lower the lip edge 53 with respect to the baffle top, the faster grain flows through the drum.

The rotation of the drum 21 will naturally cause a flow of grain across the drum, from the intake side to the discharge side. However, with a natural movement, the grain surface may acquire a substantial undesirable slope. To avoid this condition a series of spiraled flites 54 are affixed to the inner wall of the drum, the flite serving a double function of moving and mixing the grain.

The upper section 52 of the discharge chute extends downwardly and outwardly a short distance at an approximate angle of 45 degrees. A lower discharge chute 55, underneath the first is connected therewith to extend the opposite direction at an angle of 45 degrees to terminate at the intake hopper 56 of the grain roller R. Both the upper and lower sections of the chute D are formed as simple, rectangular conduits which may be made of lumber or sheet metal of a size suitable to permit an easy flow of grain through them. Additionally, each is provided with a heaed metal floor plate 57 and 58, respectively, to impose an intense dry heat on the grain as it flows through the chutes and to the roller. A preferred method of heating the floor plates is to use the steam supply which also cooks the grain by directing the steam through conduits in the floor plates before the steam is released into the drum 21. Thus, these plates are at the maximum temperature of the steam before the steam has a chance to expand and cool, and at an ideal temperature for the purpose at hand.

Each floor plate is formed as a flat tube-like member, with the upper floor plate 57 having a passageway at each side thereof to reverse the flow of steam through it. The steam line S, controlled by a valve 59, is connected to the lower edge, and at one side of the upper floor plate 57. Referring to FIG. 11, the flow of steam is upwardly along one side of this upper floor plate and thence the steam turns downwardly in the conduit at the other side of the plate 57. A short pipe section 60 connects the bottom end of this second side of the plate 57 with the floor plate 58 of the lower chute section 55. Thence, the hot steam travels downwardly in this plate 58 to the bottom of the chute and into the intake hopper 56 of the roller. A lapped pipe section 61 is formed in this hopper 56 extending pipe portions back and forth, longitudinally within the hopper as illustrated at FIG. 6. Thence, at one end of the hopper a first pipe portion extends upwardly as a feed line 62 to the drum. The line 62, including a valve 63, extends through the lid 40 and into the drum 21, its discharge nozzle 64 being in the lower portion of the drum to direct steam into grain which is coming from the intake feed chute. A second branch line 65 extends from the juncture of the lapped section 61 and feed line 62 to be directed away from the apparatus for blowoff, the line 65 including a valve 66

The grain roller is of a conventional type having a pair of crushing rolls 70 below the intake hopper 56, as diagrammatically indicated at FIG. 2. This unit is operated by a suitable motor 71 connected to a heavy duty belting and shafting system as illustrated at FIG. 1. The hopper 56 includes longitudinally extended baffles 72 to facilitate spreading the grain as it flows into the rollers 70, and it is to be noted that the lapped pipe section 61 in the hopper above these baffles not only functions to heat the grain but also to facilitate its spreading.

The operation of the apparatus is fundamentally simple. The grain flow from the intake chute F into the drum 21 will continue as long as there is flow through the apparatus. The grain will remain at a selected level in the drum depending upon the elevation of the baffle 45 as hereinbefore described. Steam is applied to the grain as it enters the drum to commence the cooking and softening of the grain. The flites 54 across the interior of the drum effectively agitate and stir this grain as they move the grain through the drum toward the discharge end thereof, and all the while the flow of steam is permeating and cooking the individual kernels of grain, so that by the time the grain reaches the discharge chute it is substantially cooked in an environment of moist heat. The flow of grain from the drum and into the discharge chute is regulated by the height of the lip on the discharge chute as hereinbefore explained and when the grain falls into this discharge chute, it flows along the surfaces of the hot floor plates and about the lapped pipe 61 to be further cooked in an environment of dry heat at a temperature as high as or slightly higher than the temperature of the steam released in the drum.

Although the flow of grain through the chute D is comparatively rapid, the heat of the floor plates has a profound effect upon the final condition of the individual kernels of grain. Each grain kernel is dry, will remain dry when it cools, and is completely soft throughout its core. Evidently the rapid movement from the cooker to the roller in this dry heat environment, a few seconds at the most, is sufficient to drive all moisture that may be on the surface of the grain kernels, apparently into the grain to complete the cooking operation and at the same time completely dry the grain so the condensation problem is eliminated. Nutritious, completely cooked kernels of grain result from the operation which is a continuous process with the grain flow maintaining the cooker in a filled condition.

We claim:

1. Apparatus for cooking cereal grain and preparing the same for rolling or the like comprising, in combination:
    (a) an enclosed rotatable, cylindrical cooking drum adapted to rotate on a substantially horizontal axis;
    (b) an intake chute directed into one end of the drum;
    (c) a feeding-holding means at the end of the intake chute within the drum adapted to move grain from the intake chute and into the drum but to hold the amount of grain in the drum to a selected level near the top of the drum;
    (d) a discharge chute extending from the drum and having an inlet lip within the drum located approximately at the aforesaid selected level and thereby being adapted to receive grain when the drum, filled with grain to the said selected level, is rotated; and
    (e) a steam supply line having its outlet within the drum adjacent to the end of the grain intake chute whereby to direct steam against fresh grain entering the drum.

2. In the combination defined in claim 1, wherein said discharge chute includes a dry-heat means adapted to heat grain flowing therethrough.

3. In the organization set forth in claim 1 wherein said discharge chute includes a heated floor over which the grain must flow.

4. In the organization set forth in claim 1 wherein the discharge chute includes a heated floor section and a steam conduit associated therewith, including a steam conduit passageway extending through the floor whereby to maintain the temperature of the floor at the temperature of steam flowing therethrough.

5. In the organization set forth in claim 1 wherein the intake feeding-holding means includes an annular array of paddles about the drum at the wall adjacent to the intake chute, said intake chute including a downspout-like extension within the drum terminating over said paddles and an arcuate baffle offset at the side of the downspout chute and lapping with the downspout extension end of the chute to thereby enclose a reach of the paddles in a passageway formed below the end of the downspout and the baffle offset through which the paddles move, said paddles being adapted to move within the passageway from the top of the baffle, and thence downwardly through the passageway and thence underneath the downspout end of the drum.

6. In the organization set forth in claim 5 wherein the baffle intake is near the top of the drum to establish a filling level of grain in the drum, and the discharge chute inlet lip is positioned below the level of the baffle intake a short distance to establish a selected flow through the drum, and flites in the drum adapted to facilitate movement of grain therethrough.

References Cited

UNITED STATES PATENTS

| | | | |
|---|---|---|---|
| 2,488,653 | 11, 1949 | Andree | 99—235 |
| 2,597,442 | 5/1952 | Borrow | 99—235 |
| 3,315,589 | 4/1967 | Hirahara | 99—235 |

ROBERT W. JENKINS, Primary Examiner

U.S. Cl. X.R.

99—80, 238.5; 106—40